United States Patent [19]

Shekleton et al.

[11] Patent Number: 5,163,287
[45] Date of Patent: Nov. 17, 1992

[54] STORED ENERGY COMBUSTOR WITH FUEL INJECTOR CONTAINING IGNITER MEANS FOR ACCOMMODATING THERMAL EXPANSION

[75] Inventors: Jack R. Shekleton, San Diego; Robert W. Smith, Lakeside, both of Calif.

[73] Assignee: Sundstrand Corporation, Rockford, Ill.

[21] Appl. No.: 455,244

[22] Filed: Dec. 22, 1989

[51] Int. Cl.⁵ ............................................. F02C 1/00
[52] U.S. Cl. ................................. 60/39.32; 60/39.821
[58] Field of Search ............ 60/39.12, 39.141, 39.142, 60/39.821, 39.827, 39.32, 722, 733, 743, 746, 748, 752, 760; 431/254, 258, 260, 263, 264, 265, 266

[56] References Cited

U.S. PATENT DOCUMENTS

| | | | |
|---|---|---|---|
| Re. 23,149 | 9/1949 | Lubbock et al. | 60/760 |
| 2,541,900 | 2/1951 | Williams . | |
| 2,616,257 | 11/1952 | Mock . | |
| 2,918,118 | 12/1959 | Schirmer . | |
| 3,030,773 | 4/1962 | Johnson | 60/748 |
| 3,937,011 | 2/1976 | Carvel et al. | 60/748 |
| 4,023,351 | 5/1977 | Beyler et al. | 60/748 |
| 4,342,551 | 8/1982 | Browning | 431/158 |
| 4,938,019 | 7/1990 | Angell et al. | 60/39.827 |

Primary Examiner—Richard A. Bertsch
Assistant Examiner—Timothy S. Thorpe
Attorney, Agent, or Firm—Wood, Phillips, Mason, Recktenwald & VanSanten

[57] ABSTRACT

In order to optimize ignition capabilities, while at the same time enhancing the life span of an igniter, a stored energy combustor (10) has an igniter (34) disposed within a fuel injector (26). The fuel injector (26) is disposed in a tubular extension (16) leading to a combustion chamber (20) and has a discharge end (28) communicating with a point of entry into the combustion chamber (20). An oxidant inlet port (24) is provided upstream of the combustion chamber (20) for directing oxidant into the combustion chamber (20). The oxidant inlet port (24) directs oxidant through the tubular extension (16) leading to the combustion chamber (20) in surrounding relation to the fuel injector (26). With this arrangement, the igniter (34) is disposed within the fuel injector (26) along a longitudinal axis (22) of the stored energy combustor (10).

14 Claims, 1 Drawing Sheet

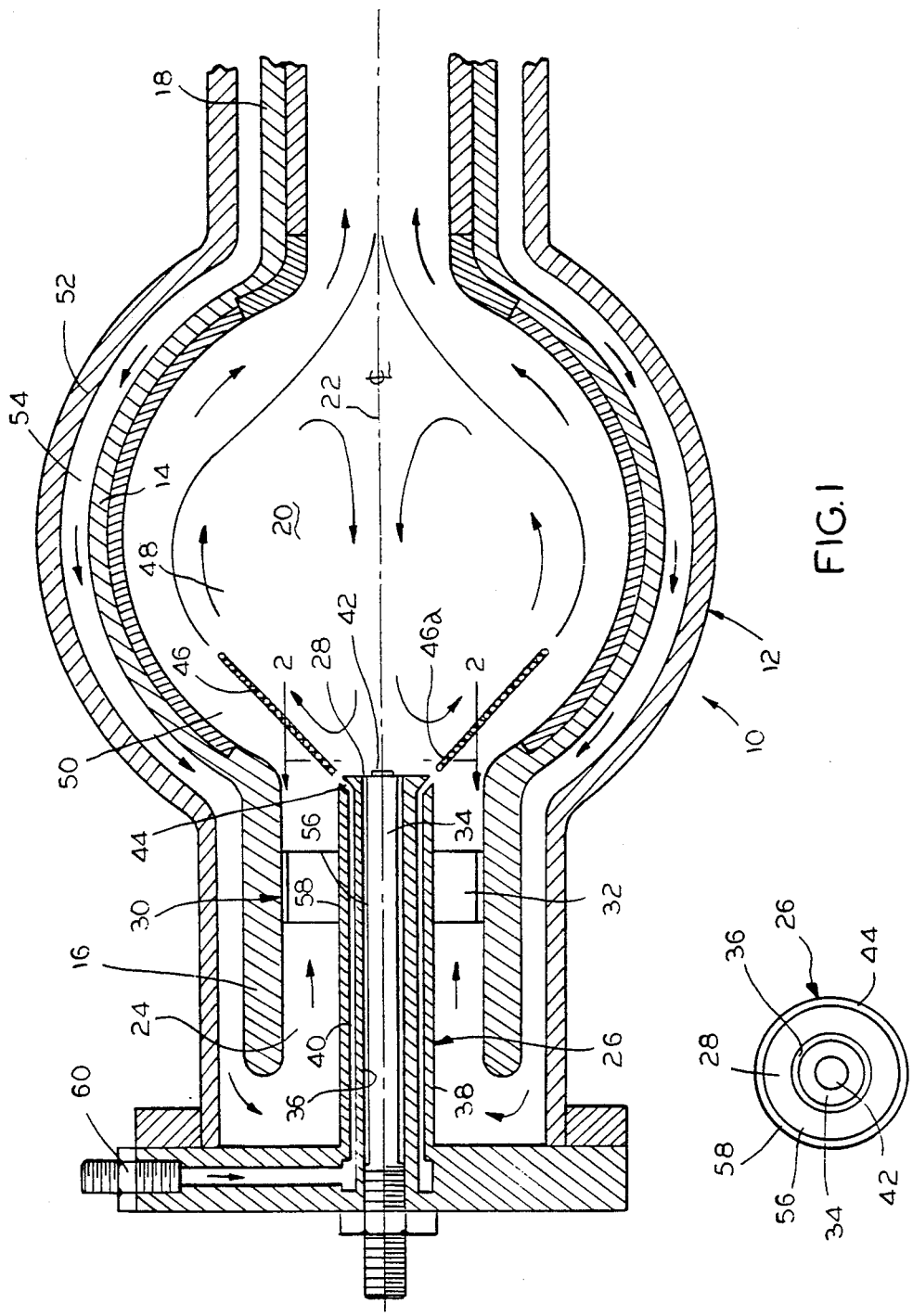

STORED ENERGY COMBUSTOR WITH FUEL INJECTOR CONTAINING IGNITER MEANS FOR ACCOMMODATING THERMAL EXPANSION

FIELD OF THE INVENTION

The present invention is directed to a stored energy combustor and, more particularly, a stored energy combustor having a fuel injector encased igniter.

BACKGROUND OF THE INVENTION

Stored energy combustors have long been utilized for producing hot gases of combustion under pressure to operate turbines. In such stored energy combustors, a fuel is typically combusted with an oxidant to produce the hot gases of combustion, and additional fuel may typically be introduced into the hot gases of combustion to be vaporized, or partly decomposed, or both. By so doing, the volume of hot gas can be increased while bringing the temperature of combustion down to a temperature incapable of causing damage to the turbine.

Ignition is a most critical part of the combustion process and, in some instances, it is a requirement that ignition occur on the first spark. This is particularly true of emergency power applications, and it is, of course, a much more demanding requirement than typical combustors since it mandates a high degree of design excellence. To achieve reliable ignition, air inlet velocities at entry to the combustion zone must be low, e.g., below about 275 feet per second.

For ignition purposes, an igniter is typically located at the outer diameter of the combustor. It there provides a spark or series of sparks of significant energy level to provide ignition. Generally speaking, the fuel spray is directed to impact the igniter to achieve ignition.

Typically, in stored energy combustors, operational combustion chamber pressures reach as high as 300 psia or greater with flame temperatures reaching as high as 3800° F. When the oxidant is oxygen, substantially higher temperatures are reached. From the foregoing, it will be appreciated that the igniter is continuously exposed to high temperature gases which are at relatively high velocities.

As a result of these operating conditions, the life of the igniter can be significantly shortened. If gas velocities are raised to achieve a more compact combustor, then igniter life is diminished even further and, at the same time, the ability to achieve extremely high ignition reliability such as "first spark" ignition is diminished. Still further, it is known to be desired to maintain hot combustor walls on the order of 1,000° F. or greater.

In this connection, the hot combustor walls are required to avoid undesirable carbon buildup inside the combustor. This, however, means that the fit between the igniter and the combustor wall must be carefully designed for relative expansion and contraction between the combustor wall and the igniter during heat up and cool down in order to avoid undesirable leakage. For all of these reasons, it will be appreciated that there are numerous problems in connection with igniters in combustors.

Among prior igniter design efforts, Beyler et al. U.S. Pat. No. 4,023,351 utilizes a centrally disposed igniter. This igniter is not, however, cooled in any way which would successfully overcome the problems mentioned hereinabove. Likewise, Schirmer U.S. Pat. No. 2,918,118 utilizes a centrally disposed igniter. This igniter also is, likewise, not cooled in any way capable of overcoming the problems mentioned hereinabove. Still further, Williams U.S. Pat. No. 2,541,900 utilizes an igniter adjacent a swirl pipe atomizing jet to start a gas turbine engine following which a main fuel supply is activated.

While of interest, none of the foregoing igniter designs achieves enhanced performance while providing a longer life span. In contrast, the present invention is directed to overcoming one or more of the foregoing problems and achieving the resulting objectives.

SUMMARY OF THE INVENTION

It is the principal object of the invention to provide a new and improved stored energy combustor. More specifically, it is an object of the invention to provide a stored energy combustor with enhanced ignition reliability. It is also an object of the invention to provide a stored energy combustor having an enhanced ignition life span.

An exemplary embodiment of the invention achieves the foregoing in a stored energy combustor comprising a vessel having a wall defining narrow, spaced apart inlet and outlet ends interconnected by a relatively wide combustion chamber. The vessel has a longitudinal axis extending from the inlet end through the combustion chamber to the outlet end thereof. The inlet end and outlet end are generally tubular extensions of the vessel leading to and from the combustion chamber. Still further features of the invention include an oxidant inlet port upstream of the combustion chamber, fuel injection means in the tubular extension of the vessel leading to the combustion chamber, and means for igniting oxidant and fuel in the combustion chamber to produce hot gases of combustion.

In the exemplary embodiment, the oxidant inlet port is adapted to direct oxidant into the combustion chamber. More specifically, the oxidant inlet port directs oxidant through the tubular extension of the vessel leading to the combustion chamber in surrounding relation to the fuel injection means. Still additionally, the oxidant inlet port is concentric with the longitudinal axis of the vessel at the inlet end thereof.

As for the fuel injection means, it has a discharge end communicating with a point of entry into the combustion chamber. The discharge end of the fuel injection means is adapted to direct fuel into the combustion chamber where it can be ignited with the oxidant to produce the hot gases of combustion. In this connection, fuel injection means discharge end is also concentric with the longitudinal axis of the vessel at the combustion chamber.

In accordance with the invention, the igniting means is disposed within the fuel injection means on the longitudinal axis of the vessel. For this purpose, the fuel injection means preferably comprises a fuel injector comprising a double-walled hollow tube defining a fuel passageway extending in generally concentric relation to the longitudinal axis of the vessel, and the fuel injector is formed such that the fuel passageway terminates in a conically diverging fuel nozzle for directing a conically diverging spray of fuel into the combustion chamber. With this understanding, the igniting means preferably is disposed within the double-walled hollow tube radially inwardly of the fuel passageway to provide cooling thereby.

In a highly preferred embodiment, the tubular extension of the vessel leading to the combustion chamber directs oxidant into the combustion chamber outwardly of the conically diverging spray of fuel from the conically diverging fuel nozzle. As for the igniting means, it advantageously comprises a tubular igniter disposed within the double-walled tube of the fuel injector so as to be in closely spaced adjacent relation to an inner surface thereof to thereby accommodate relative expansion therebetween. Still additionally, the combustor preferably includes means upstream of the combustion chamber and the conically diverging fuel nozzle for swirling oxidant in the tubular extension of the vessel leading to the combustion chamber.

In a most highly preferred embodiment, the vessel has an interior wall as well as an exterior wall in closely spaced relation thereto. The interior and exterior walls define an oxidant flow path extending substantially completely about the vessel from the outlet end to the inlet end. Still additionally, the combustion chamber is preferably generally spherically shaped intermediate the tubular extensions leading thereto and therefrom.

Preferably, the discharge end of the fuel injector is disposed in a plane defining a point of entry into the combustion chamber. And the igniter may be substantially entirely contained within and surrounded by the fuel injector radially inwardly of the fuel passageway. With this arrangement, a swirling oxidant annulus may be directed into the combustion chamber outwardly of the conically diverging spray of fuel.

As a result, the swirling oxidant annulus expands radially outwardly within the combustion chamber upon exiting the tubular extension of the vessel leading to the combustion chamber. In converse fashion, the swirling oxidant annulus contracts radially inwardly within the combustion chamber upon approaching the tubular extension of the vessel leading from the combustion chamber.

By reason of the radially expanding and contracting oxidant annulus in the combustion chamber, a zone of recirculating gases is formed. More specifically, this zone of recirculating gases is formed inwardly of the interior wall of the vessel. Advantageously, the conically diverging spray of fuel is directed between the radially expanding oxidant annulus and the zone of recirculating gases.

As for details of the fuel injector, the double-walled hollow tube preferably comprises an inner tube and an outer tube radially spaced therefrom. The tubular igniter is then advantageously radially spaced inwardly of the inner tube to by an amount sufficient to accommodate relative radial expansion and contraction of the igniter and fuel injector when subjected to heat. For cooling purposes, the tubular igniter is substantially entirely disposed within a cooling envelope defined by the fuel passageway carrying a cold liquid fuel therewithin.

Other objects, advantages and features of the present invention will become apparent from a consideration of the following specification taken in conjunction with the accompanying drawings.

BRIEF DESCRIPTION OF THE DRAWINGS

FIG. 1 is a partially schematic, partially sectional view of a stored energy combustor in accordance with the present invention; and FIG. 2 is an end elevational view of a fuel injector and igniter assembly of the stored energy combustor taken on the line 2—2 of FIG. 1.

DETAILED DESCRIPTION OF THE PREFERRED EMBODIMENT

In the illustration given, and with reference first to FIG. 1, the reference numeral 10 designates generally a stored energy combustor in accordance with the present invention. The stored energy combustor 10 includes a vessel 12 having an interior wall 14 defining narrow, spaced apart inlet and outlet ends 16 and 18 interconnected by a relatively wide combustion chamber 20. As will be appreciated, the vessel 12 has a longitudinal axis 22 extending from the inlet end 16 through the combustion chamber 20 to the outlet end 18 thereof.

In the embodiment illustrated in FIG. 1, the combustion chamber 20 is generally spherical although various other shapes may also utilize the inventive concept. The inlet end 16 and outlet end 18 are generally tubular extensions of the vessel 12 leading, respectively, to and from the combustion chamber 20, and an oxidant inlet port 24 is provided upstream of the combustion chamber 20 for directing oxidant through the tubular extension 16 into the combustion chamber 20. As shown, the oxidant inlet port 24 is generally concentric with the longitudinal axis 22 of the vessel 12 at the inlet end 16 thereof.

Still referring to FIG. 1, the stored energy combustor 10 includes fuel injection means in the form of a fuel injector generally designated 26. The fuel injector 26 is disposed in the tubular extension 16 of the vessel 12 leading to the combustion chamber 20, and it has a discharge end 28 in a plane defining a point of entry into the combustion chamber 20 for directing fuel into the combustion chamber 20, i.e., the plane defined by the juncture between the tubular extension 16 and the spherical portion of the interior wall 14 defining the combustion chamber 20. As with the oxidant inlet port 24, the fuel injector 26 is concentric with the longitudinal axis 22 of the vessel 12.

As for the oxidant inlet port 24, it directs oxidant into the combustion chamber 20 through the tubular extension 16 of the vessel 12 in surrounding relation to the fuel injector 26. Also, the stored energy combustor 10 includes means upstream of the combustion chamber 20 for swirling the oxidant in the tubular extension 16 of the vessel 12 in the form of an air swirler 30 comprised of a plurality of circumferentially spaced and radially extending vanes 32 for spinning oxidant in the tubular extension 16 to a swirl angle of between 40 and 70 degrees. As a result, the tubular extension 16 of the vessel 12 is able to direct oxidant in a swirling annulus into the combustion chamber 20 as will be described in greater detail hereinafter.

With reference to FIG. 1, means are provided for igniting the oxidant and the fuel in the combustion chamber 20 to produce hot gases of combustion. Preferably, the igniting means takes the form of a tubular igniter 34 disposed within the fuel injector 26 in closely spaced adjacent relation to an inner surface 36 of a double-walled hollow tube 38 defining a fuel passageway 40 extending in generally concentric relation to the longitudinal axis 22 of the vessel 12. In other words, the tubular igniter 34 is disposed within the double-walled hollow tube 38 radially inwardly of the fuel passageway 40.

Still more specifically, the tubular igniter 34 preferably includes an ignition tip 42 for igniting the oxidant and the fuel in the combustion chamber 20. Thus, almost the entirety of the tubular igniter 34 with the exception of the ignition tip 42 is substantially entirely contained within and surrounded by the fuel injector 26. In this connection, the tubular igniter 34 is also generally concentric with the longitudinal axis 22 of the vessel 12 since it is concentrically disposed within the fuel injector 26.

Referring to FIGS. 1 and 2, the fuel injector 26 is formed such that the fuel passageway 40 terminates in a conically diverging fuel nozzle 44 for directing a conically diverging spray of fuel as at 46 into the combustion chamber 20. The swirling oxidant annulus expands radially outwardly within the combustion chamber 20 upon exiting the tubular extension 16 of the vessel 12, contracts radially inwardly within the combustion chamber 20 upon approaching the tubular extension 18 of the vessel 12, and causes a zone of recirculating gases as at 48 inwardly of the spherical portion of the interior wall 14 defining the combustion chamber 20. With this understanding, it will be seen that the conically diverging spray of fuel as at 46 is directed between the radially expanding oxidant annulus in the region designated 50 and the zone of recirculating gases as at 48.

In the exemplary embodiment, the vessel 12 also has an exterior wall 52 in closely spaced relation to the interior wall 14 to define an oxidant flow path 54 extending substantially completely about the vessel 12 from the outlet end 18 to the inlet end 16. It will be appreciated that oxidant will typically flow from a source (not shown) first along the tubular extension 18, then along the spherical portion of the interior wall 14 defining the combustion chamber 20, and then along the tubular extension 16 to the oxidant inlet port 24. As the oxidant flows along the path 54 between the walls 14 and 52, it serves to cool the interior wall 14 in a most advantageous manner while at the same time delivering oxidant to the inlet port 24 for delivery through the tubular extension 16 to the combustion chamber 20.

Referring once again to the fuel injector 26, the double-walled hollow tube 38 preferably comprises an inner tube 56 and an outer tube 58 radially spaced therefrom. The tubular igniter 34 is also radially spaced from the inner tube 56, as shown, to accommodate relative radial expansion of the igniter 34 and the fuel injector 26 upon subjection to heat such that, when the tubular igniter 34 makes contact with the inner surface 36 of the inner tube 56, it may be subjected to the cooling effects of a cold liquid fuel delivered through the fuel passageway 40. In other words, the tubular igniter 34 is substantially entirely disposed within a cooling envelope defined by the fuel passageway 40 carrying the cold liquid fuel from a fuel inlet port 60.

As will now be appreciated, the conical spray of fuel as at 46 is appropriately angled to more or less commingle with the swirling oxidant annulus as at 50. The conical spray of fuel as at 46 may typically comprise a spray of fuel droplets. In addition, the recirculation zone as at 48 is provided due to the aerodynamic action of the radially expanding and contracting oxidant annulus.

Generally speaking, it is desirable to provide a strong (large volume) recirculation zone as at 48 within the combustion chamber 20. This is facilitated by utilizing a high air swirl angle and a high expansion ratio, i.e., a high ratio of the diameter of the combustion chamber 20 relative to the diameters of the tubular extensions 16 and 18. In this manner, it is possible to achieve a high mass flow within the recirculation zone as at 48 to facilitate continuous combustion within the combustion chamber 20.

Once a momentary flame is produced by the tubular igniter 34, the flame propagates to cause inflammation in the recirculation zone as at 48. This flame causes ignition of the conically diverging fuel spray in the region 46a at the interface with the swirling oxidant annulus directly opposite thereof. Thereafter, continuous ignition is obtained due to the presence of the recirculating hot gases of combustion in the recirculation zone as at 48.

By reason of the location of the tubular igniter 34 in close proximity to the continuous ignition point as at 46a, ignition is greatly facilitated. The tubular igniter 34, and in particular the tip 42, is located in a region of relatively low velocity though hot gas recirculation. However, the presence of the cooling envelope defined by the fuel passageway 40 carrying the cold liquid fuel serves as a very effective coolant for the tubular igniter 34.

For even more effective cooling, a very close fit may be provided between the tubular igniter 34 and the fuel injector 26 to thereby enhance and optimize heat exchange characteristics. Because of the optimal location for the tubular igniter 34, ignition is enhanced while making it possible to provide a cheaper, lighter, more compact combustor 10 capable of utilizing low ignition energy while providing longer igniter life.

While in the foregoing there has been set forth a preferred embodiment of the invention, it will be appreciated that the details herein given may be varied by those skilled in the art without departing from the true spirit and scope of the appended claims.

We claim:
1. A stored energy combustor, comprising:
a vessel having a wall defining narrow, spaced apart inlet and outlet ends interconnected by a relatively wide combustion chamber;
said vessel having a longitudinal axis extending from said inlet end through said combustion chamber to said outlet end thereof, said inlet end and outlet end being generally tubular extensions of said vessel leading to and from said combustion chamber;
an oxidant inlet port upstream of said combustion chamber for directing oxidant into said combustion chamber, said oxidant inlet port being concentric with said longitudinal axis of said vessel at said inlet end;
fuel injection means in said tubular extension of said vessel leading to said combustion chamber, said fuel injection means having a discharge end communicating with a point of entry into said combustion chamber for directing fuel into said combustion chamber, said fuel injection means being concentric with said longitudinal axis of said vessel;
said oxidant inlet port directing oxidant into said combustion chamber through said tubular extension of said vessel leading to said combustion chamber in surrounding relation to said fuel injection means; and
means for igniting said oxidant and said fuel in said combustion chamber to produce hot gases of combustion, said igniting means being disposed within said fuel injection means on said longitudinal axis of said vessel;

said fuel injection means comprising a fuel injector including a double-walled hollow tube defining a fuel passageway extending in generally concentric relation to said longitudinal axis of said vessel, said igniting means being disposed within said double-walled hollow tube of said fuel injector radially inwardly of said fuel passageway for igniting said oxidant and said fuel in said combustion chamber, said igniting means being radially spaced from an inner surface of said double-walled hollow tube to accommodate relative radial expansion upon subjection to heat sufficient for said igniting means to make contact with said inner surface of said double-walled hollow tube.

2. The stored energy combustor of claim 1 wherein said fuel injector is formed such that said fuel passageway terminates in a conically diverging fuel nozzle for directing a conically diverging spray of fuel into said combustion chamber.

3. The stored energy combustor of claim 2 wherein said tubular extension of said vessel leading to said combustion chamber directs oxidant into said combustion chamber outwardly of said conically diverging spray of fuel from said conically diverging fuel nozzle.

4. The stored energy combustor of claim 3 including means upstream of said combustion chamber and said conically diverging fuel nozzle of said fuel injector for swirling said oxidant in said tubular extension of said vessel leading to said combustion chamber.

5. A stored energy combustor, comprising:
a vessel having an interior wall defining narrow, spaced apart inlet and outlet ends interconnected by a relatively wide combustion chamber;
said vessel having a longitudinal axis extending from said inlet end through said combustion chamber to said outlet end thereof, said combustion chamber being generally spherical, said inlet end and outlet end being generally tubular extensions of said vessel leading to and from said combustion chamber;
an oxidant inlet port upstream of said combustion chamber for directing oxidant into said combustion chamber, said oxidant inlet port being concentric with said longitudinal axis of said vessel at said inlet end;
fuel injection means in said tubular extension of said vessel leading to said combustion chamber, said fuel injection means having a discharge end at a point of entry into said combustion chamber for directing fuel into said combustion chamber, said fuel injection means being concentric with said longitudinal axis of said vessel;
said oxidant inlet port directing oxidant into said combustion chamber through said tubular extension of said vessel leading to said combustion chamber in surrounding relation to said fuel injection means; and
means for igniting said oxidant and said fuel in said combustion chamber to produce hot gases of combustion, said igniting means being disposed within said fuel injection means on said longitudinal axis of said vessel;
said fuel injection means comprising a fuel injector including a double-walled hollow tube defining a fuel passageway extending in generally concentric relation to said longitudinal axis of said vessel, said igniting means being disposed within said double-walled hollow tube of said fuel injector radially inwardly of said fuel passageway for igniting said oxidant and said fuel, said igniting means comprising a tubular igniter disposed within said double-walled hollow tube of said fuel injector in closely spaced adjacent relation to an inner surface thereof, said tubular igniter being radially spaced from said inner surface of said double-walled hollow tube to accommodate relative radial expansion upon subjection to heat sufficient for said tubular igniter to make contact with said inner surface of said double-walled hollow tube.

6. The stored energy combustor of claim 5 wherein said fuel injector is formed such that said fuel passageway terminates in a conically diverging fuel nozzle for directing a conically diverging spray of fuel into said combustion chamber.

7. The stored energy combustor of claim 6 wherein said tubular extension of said vessel leading to said combustion chamber directs oxidant into said combustion chamber outwardly of said conically diverging spray of fuel from said conically diverging fuel nozzle.

8. The stored energy combustor of claim 7 including means upstream of said combustion chamber and said conically diverging fuel nozzle of said fuel injector for swirling said oxidant in said tubular extension of said vessel leading to said combustion chamber.

9. The stored energy combustor of claim 5 wherein said vessel also has an exterior wall in closely spaced relation to said interior wall to define an oxidant flow path extending substantially completely about said vessel from said outlet end to said inlet end.

10. A stored energy combustor, comprising:
a vessel having an interior wall defining narrow, spaced apart inlet and outlet ends interconnected by a relatively wide combustion chamber;
said vessel having a longitudinal axis extending from said inlet end through said combustion chamber to said outlet end thereof, said combustion chamber being generally spherical, said inlet end and outlet end being generally tubular extensions of said vessel leading to and from said combustion chamber;
an oxidant inlet port upstream of said combustion chamber for directing oxidant into said combustion chamber, said oxidant inlet port being concentric with said longitudinal axis of said vessel at said inlet end;
fuel injection means in said tubular extension of said vessel leading to said combustion chamber, said fuel injection means having a discharge end at a plane defining a point of entry into said combustion chamber for directing fuel into said combustion chamber, said fuel injection means being concentric with said longitudinal axis of said vessel;
said oxidant inlet port directing oxidant into said combustion chamber through said tubular extension of said vessel leading to said combustion chamber in surrounding relation to said fuel injection means; and
means for igniting said oxidant and said fuel in said combustion chamber to produce hot gases of combustion, said igniting means being substantially entirely contained within and surrounded by said fuel injection means, said igniting means being positioned so as to be generally concentric with said longitudinal axis of said vessel;
said fuel injection means comprising a fuel injector including a double-walled hollow tube defining a fuel passageway extending in generally concentric relation to said longitudinal axis of said vessel, said igniting means being disposed within said double-walled hollow tube of said fuel injector radially inwardly of said fuel passageway for igniting said oxidant and said fuel, said igniting means comprising a tubular igniter disposed within said double-walled hollow tube of said fuel injector in closely spaced adjacent relation to an inner surface thereof, said tubular igniter being radially spaced from said inner surface of said double-walled hollow tube to accommodate relative radial expansion upon subjection to heat sufficient for said tubular igniter to make contact with said inner surface of said double-walled hollow tube.

said fuel injector being formed such that said fuel passageway terminates in a conically diverging fuel nozzle for directing a conically diverging spray of fuel into said combustion chamber, and including means upstream of said combustion chamber and said conically diverging fuel nozzle of said fuel injector for swirling said oxidant in said tubular extension of said vessel leading to said combustion chamber, said tubular extension of said vessel leading to said combustion chamber directing oxidant in a swirling annulus into said combustion chamber outwardly of said conically diverging spray of fuel;

said swirling oxidant annulus expanding radially outwardly within said combustion chamber upon exiting said tubular extension of said vessel leading to said combustion chamber, said swirling oxidant annulus contracting radially inwardly within said combustion chamber upon entering said tubular extension of said vessel leading from said combustion chamber;

said radially expanding and contracting oxidant annulus causing a zone of recirculating gases inwardly of said interior wall of said vessel, said conically diverging spray of fuel being directed between said radially expanding oxidant annulus and said zone of recirculating gases.

11. The stored energy combustor of claim 10 wherein said vessel also has an exterior wall in closely spaced relation to said interior wall to define an oxidant flow path extending substantially completely about said vessel from said outlet end to said inlet end.

12. The stored energy combustor of claim 10 wherein said oxidant swirling means comprises an air swirler including a plurality of vanes for spinning oxidant in said tubular extension leading to said combustion chamber to a swirl angle of between 40 and 70 degrees.

13. The stored energy combustor of claim 10 wherein said double-walled hollow tube comprises an inner tube and an outer tube radially spaced therefrom, said tubular igniter being radially spaced from said inner tube to accommodate radial expansion of said igniter therewithin.

14. The stored energy combustor of claim 13 wherein said fuel is a cold liquid fuel, said tubular igniter being substantially entirely disposed within a cooling envelope defined by said fuel passageway, said cold liquid fuel cooling said igniter.

* * * * *